United States Patent
Blumenberg et al.

(10) Patent No.: US 10,551,200 B2
(45) Date of Patent: Feb. 4, 2020

(54) SYSTEM AND METHOD FOR ACQUIRING MAP PORTIONS BASED ON EXPECTED SIGNAL STRENGTH OF ROUTE SEGMENTS

(71) Applicant: Apple Inc., Cupertino, CA (US)

(72) Inventors: Christopher Blumenberg, San Francisco, CA (US); Seejo K. Pylappan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 15/613,537

(22) Filed: Jun. 5, 2017

(65) Prior Publication Data

US 2017/0268888 A1    Sep. 21, 2017

Related U.S. Application Data

(63) Continuation of application No. 14/981,711, filed on Dec. 28, 2015, now Pat. No. 9,671,234, and a continuation of application No. 13/489,262, filed on Jun. 5, 2012, now Pat. No. 9,222,787.

(51) Int. Cl.
*G01C 21/32* (2006.01)
*G01C 21/36* (2006.01)

(52) U.S. Cl.
CPC .............. *G01C 21/32* (2013.01); *G01C 21/36* (2013.01); *G01C 21/367* (2013.01)

(58) Field of Classification Search
CPC ....... G01C 21/32; G01C 21/36; G01C 21/367
USPC ...................................................... 701/420
See application file for complete search history.

(56) References Cited

U.S. PATENT DOCUMENTS

| 5,448,773 | A | 9/1995 | McBurney et al. |
| 6,321,158 | B1 * | 11/2001 | DeLorme ............... G01C 21/26 340/995.16 |
| 6,871,139 | B2 | 3/2005 | Liu et al. |
| 7,321,824 | B1 * | 1/2008 | Nesbitt ................ G01C 21/367 701/426 |

(Continued)

OTHER PUBLICATIONS

Benjamin T. Weber, "Mobile Map Browsers: Anticipated User Interaction for Data Pre-Fetching," The Graduate School, The University of Maine, Dec. 2010, 113 pages.

(Continued)

*Primary Examiner* — Tuan C To
(74) *Attorney, Agent, or Firm* — Robert C. Kowert; Kowert, Hood, Munyon, Rankin & Goetzel, P.C.

(57) ABSTRACT

Embodiments may include determining a navigation route between an origination and a destination; the route may span multiple portions of a map. Embodiments may also include receiving an order of priority in which to receive the multiple portions of the map; the order may be generated based on distinct levels of expected signal strength for each of the multiple portions. For instance, within the order of priority, map portions associated with areas of low signal strength may be ranked higher than areas of higher signal strength. Embodiments may also include acquiring at least some of the portions of the map according to the order of priority, and generating a map display comprising the multiple portions of the map. For instance, map portions associated with areas of poor reception may be downloaded first whereas map portions associated with strong signal strength may be downloaded on-the-fly during route navigation.

20 Claims, 11 Drawing Sheets

(56) References Cited

U.S. PATENT DOCUMENTS

| | | |
|---|---|---|
| 7,359,718 B2 | 4/2008 | Tao et al. |
| 7,965,881 B2 | 6/2011 | Reese et al. |
| 8,010,101 B2 | 8/2011 | Bugenhagen |
| 8,095,146 B2 | 1/2012 | Raghavachari |
| 8,103,441 B2 | 1/2012 | Callaghan et al. |
| 8,164,599 B1 | 4/2012 | Kadous et al. |
| 8,467,768 B2 | 6/2013 | Mahaffey et al. |
| 8,560,237 B2 | 10/2013 | Rudow et al. |
| 8,694,245 B2 | 4/2014 | Zubas et al. |
| 9,222,787 B2 | 12/2015 | Blumenberg et al. |
| 9,671,234 B2 | 6/2017 | Blumenberg et al. |
| 2003/0060973 A1* | 3/2003 | Mathews ............ G01C 21/26 701/410 |
| 2003/0220835 A1 | 11/2003 | Barnes, Jr. |
| 2004/0012505 A1* | 1/2004 | Yokota ............... G08G 1/0969 340/995.1 |
| 2006/0089793 A1 | 4/2006 | Rudow et al. |
| 2007/0264974 A1 | 11/2007 | Frank et al. |
| 2008/0001735 A1 | 1/2008 | Tran |
| 2008/0004037 A1 | 1/2008 | Achlioptas et al. |
| 2008/0132249 A1 | 6/2008 | Hamilton |
| 2009/0177383 A1 | 7/2009 | Tertoolen |
| 2009/0216442 A1 | 8/2009 | Luert |
| 2009/0228199 A1 | 9/2009 | Bhogal et al. |
| 2009/0271101 A1 | 10/2009 | Relyea et al. |
| 2009/0271687 A1 | 10/2009 | Lee et al. |
| 2009/0326810 A1 | 12/2009 | Callaghan et al. |
| 2010/0017124 A1* | 1/2010 | Zhao ................. G01C 21/165 701/455 |
| 2010/0145615 A1* | 6/2010 | McCrank ............. G01S 19/42 701/469 |
| 2010/0188088 A1* | 7/2010 | Nielsen ............... G06Q 10/06 324/329 |
| 2011/0071759 A1 | 3/2011 | Pande et al. |
| 2011/0081858 A1* | 4/2011 | Tolentino ............ H04B 15/00 455/41.2 |
| 2011/0144899 A1* | 6/2011 | Soelberg ........... G01C 21/3461 701/532 |
| 2011/0167128 A1 | 7/2011 | Raghunathan et al. |
| 2011/0238751 A1 | 9/2011 | Belimpasakis et al. |
| 2011/0269476 A1 | 11/2011 | Kumar |
| 2011/0287801 A1 | 11/2011 | Levin et al. |
| 2012/0009890 A1* | 1/2012 | Curcio .................. H04L 29/06 455/230 |
| 2012/0143499 A1 | 6/2012 | Petersen |
| 2012/0264447 A1 | 10/2012 | Rieger, III |
| 2012/0290636 A1* | 11/2012 | Kadous .................. G01S 1/72 709/203 |
| 2012/0315917 A1 | 12/2012 | Comeau et al. |
| 2012/0315918 A1 | 12/2012 | Kadous |
| 2013/0005297 A1* | 1/2013 | Sanders .............. H04W 4/029 455/406 |
| 2013/0035110 A1 | 2/2013 | Sridhara et al. |
| 2013/0044957 A1* | 2/2013 | Khorashadi ......... G01C 21/206 382/195 |
| 2013/0053066 A1* | 2/2013 | Khorashadi ......... H04W 4/021 455/456.2 |
| 2013/0084910 A1 | 4/2013 | Suzuki et al. |
| 2013/0122935 A1* | 5/2013 | Das ..................... G01S 5/0252 455/456.3 |
| 2013/0143590 A1 | 6/2013 | Sridhara et al. |
| 2013/0260720 A1 | 10/2013 | Miyaki |

OTHER PUBLICATIONS

Bosisio, Ada V., "RSSI—Based Localization and Tracking Algorithm for indoor environments," 2009, pp. 469-472.

Costa, Emanoel, "Simulation and measurements of the effects of different urban environments on GPS location errors using digital elevation models and building databases," 2009, pp. 267-271.

* cited by examiner

SYSTEM AND METHOD FOR ACQUIRING MAP PORTIONS BASED ON EXPECTED SIGNAL STRENGTH OF ROUTE SEGMENTS

This application is a continuation of U.S. patent application Ser. No. 14/981,711, filed Dec. 28, 2015, now U.S. Pat. No. 9,671,234 which is a continuation of Ser. No. 13/489,262, filed Jun. 5, 2012, now U.S. Pat. No. 9,222,787, which are hereby incorporated by reference herein in their entirety.

BACKGROUND

Technical Field

This disclosure relates generally to navigation, and, more specifically, to functionality of devices providing route navigation.

Description of the Related Art

Navigation capability can be found in a number of electronic devices including personal navigation devices, such as handheld Global Positioning System (GPS) Devices, as well as mobile phones that have GPS functionality. One common use for navigation-enabled devices includes navigating from an origination to a destination. For instance, a user may input a destination street address to the device, and the device may generate a suggested route that the user should travel from the user's current destination to arrive at the destination address. Generally, as the user travels the route, the device may graphically and/or audibly specify directional changes along the route, such as "turn right on Smith St. in 100 yards." One type of navigation device includes on-board navigation devices. Onboard navigation devices include map information that has been stored on the device prior to route navigation; generally the map information is stored in an onboard device's internal memory by the manufacturer. In some cases, additional or substitute map information may be added to an onboard navigation device by a user, such as by installation of memory card containing map information.

SUMMARY OF EMBODIMENTS

Embodiments of a system and method for acquiring map portions based on expected signal strength of route segments are described. Embodiments may include determining a navigation route between an origination and a destination; the route may span multiple portions of a map. For instance, the route may be generated locally on a multifunction device (e.g., a smartphone) and/or with the assistance of a map service that provides information identifying the route. Embodiments may also include receiving an order of priority in which to receive the multiple portions of the map; the order of priority may be generated based on levels of expected signal strength for each of the multiple portions of the map. In some embodiments, the levels of expected signal strength for a given portion of the map may be generated based on client-reported signal strength values for that portion of the map. For instance, client devices may detect signal strength values at periodic or aperiodic intervals, and a map service may generate an expected signal strength value from the client-reported signal strength information (e.g., a mean or median signal strength value). In various embodiments, within the order of priority, map portions associated with areas of low signal strength may be ranked higher than areas of higher signal strength. For instance, map portions associated with areas of poor reception may be highly ranked whereas map portions associated with strong signal strength may be ranked lower. Embodiments may also include acquiring at least some of the multiple portions of the map according to the order of priority. For instance, map portions associated with areas of poor reception may be downloaded first whereas map portions associated with strong signal strength may be downloaded on-the-fly during route navigation. Embodiments may also include generating a map display comprising the multiple portions of the map (e.g., for route navigation).

Figure 1A:
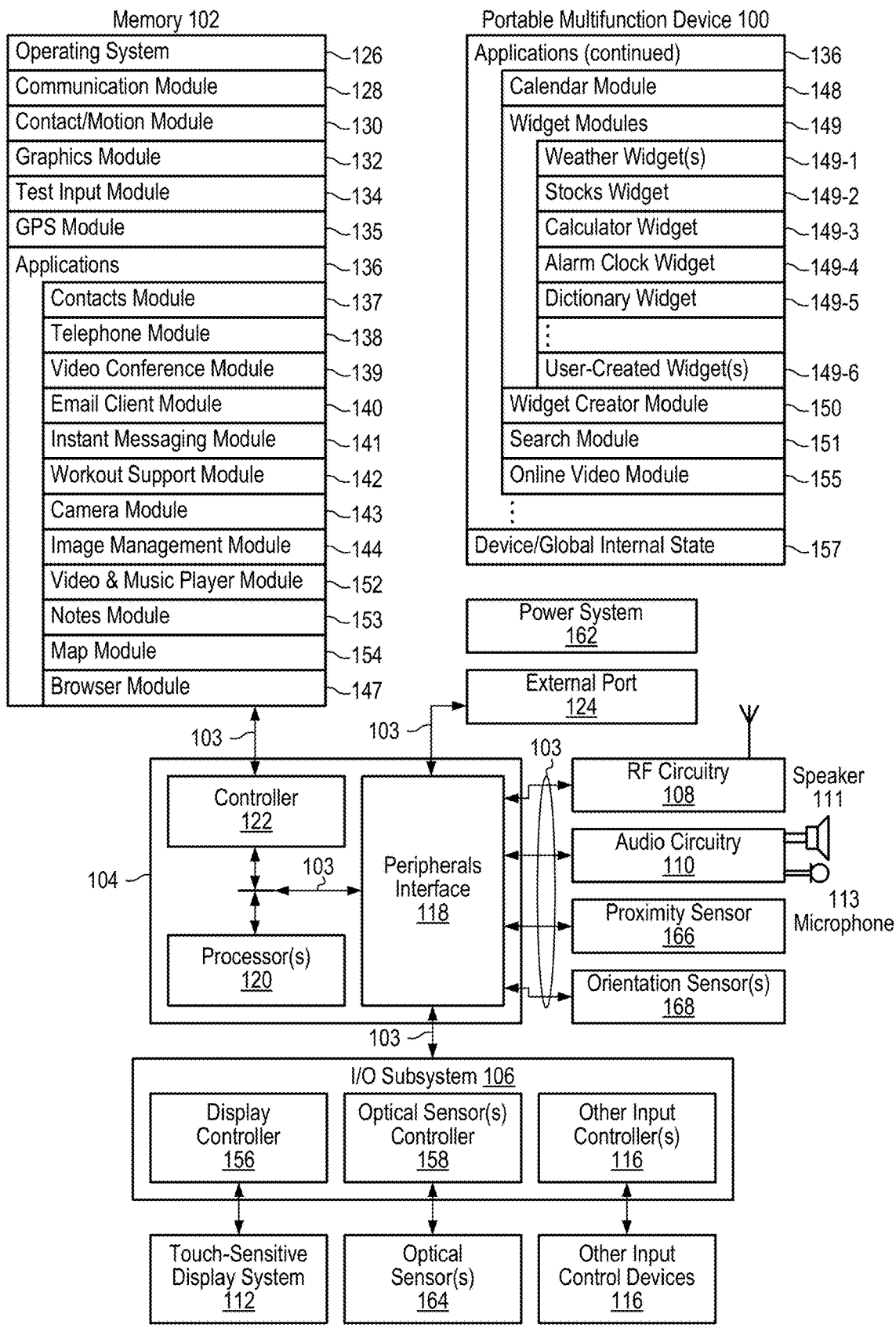
FIG. 1A illustrates a block diagram illustrating a portable multifunction device with a touch-sensitive display in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for acquiring map portions based on expected signal strength of route segments are described. Embodiments may include determining a navigation route between an origination and a destination, the route spanning multiple portions of a map. For instance, the route may be generated locally on a multifunction device (e.g., a smartphone) and/or with the assistance of a map service that provides information identifying the route. Embodiments may also include receiving an order of priority in which to receive the multiple portions of the map; the order of priority may be generated based on levels of expected signal strength for each of the multiple portions of the map. In some embodiments, the levels of expected signal strength for a given portion of the map may be generated based on client-reported signal strength values for that portion of the map. For instance, embodiments may include receiving signal strength information reported by multiple client communication devices (e.g., mobile phones, smart phones, tablet devices or other portable multifunction devices). For instance, a given client device may report messages at different locations to a network-service; each message may indicate one or more locations detected by the given client device as well as measured signal strength at those locations. For instance, in one non-limiting example a smartphone may use a GPS module to determine specific coordinates of the smartphone and report those coordinates along with a measure of cellular signal strength measured at (or proximate to) the location specified by the coordinates.

In various embodiments, within the order of priority, map portions associated with areas of low signal strength may be ranked higher than areas of higher signal strength. For instance, map portions associated with areas of poor reception may be highly ranked whereas map portions associated with strong signal strength may be ranked lower. Embodiments may also include acquiring at least some of the multiple portions of the map according to the order of priority. For instance, map portions associated with areas of poor reception may be downloaded first whereas map portions associated with strong signal strength may be downloaded on-the-fly during route navigation. In various embodiments, map portions may be cached for later use. For instance, map portions for areas of poor reception may be downloaded and cached prior to route navigation or during an initial phase of route navigation. Embodiments may also include generating a map display comprising the multiple portions of the map (e.g., for route navigation). For instance, the map display may be generated from cached map portions and/or newly acquired map portions according to the priority described above.

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present embodiments may be practiced without these specific details. In other instances, well-known methods, procedures, components, circuits, and networks have not been described in detail so as not to unnecessarily obscure aspects of various embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope of the present embodiments. The first contact and the second contact are both contacts, but they are not the same contact.

The terminology used in the description presented herein is for the purpose of describing particular embodiments only and is not intended to be limiting of As used in the present description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Example Multifunction Device

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
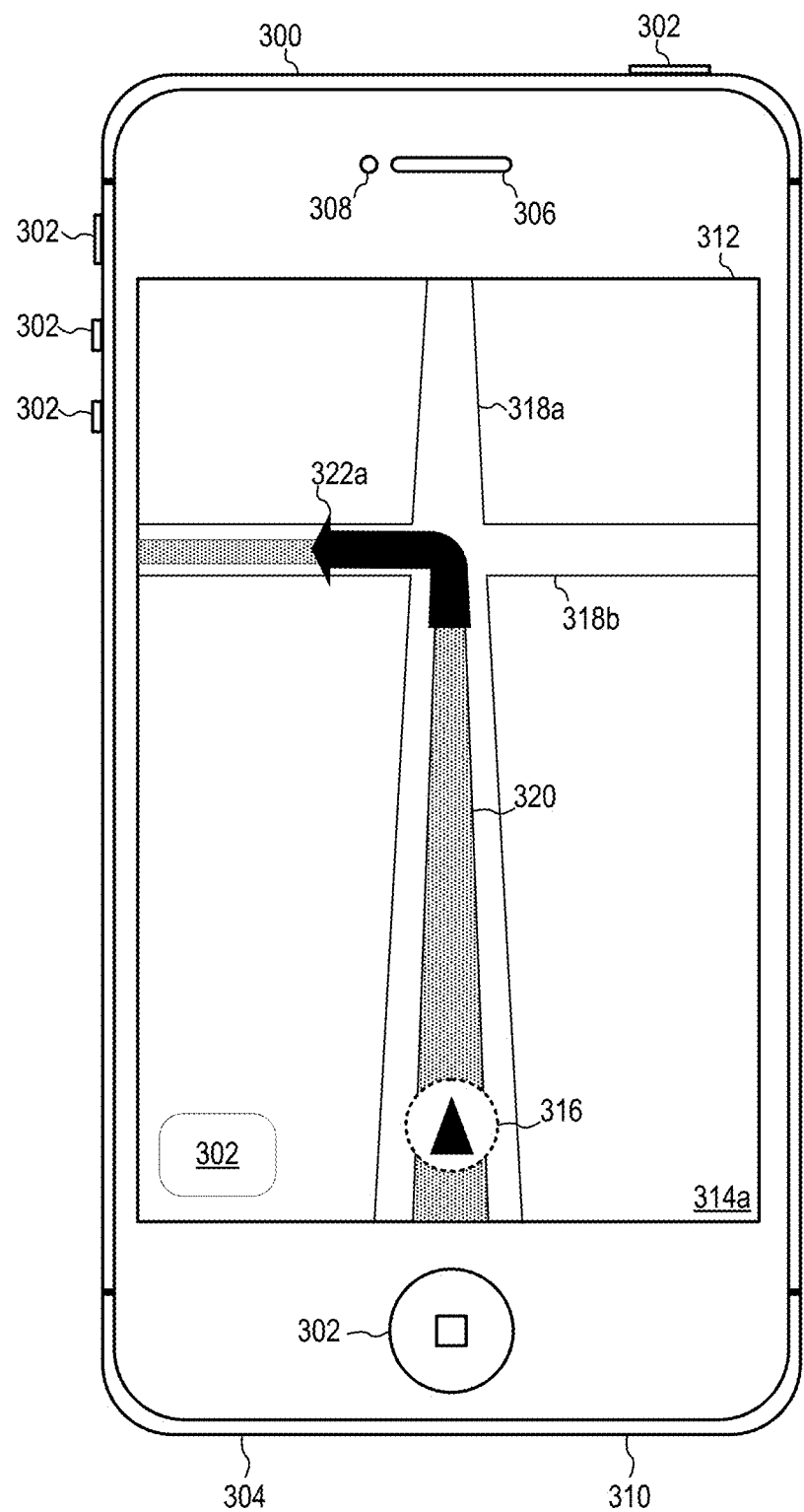
FIG. 3 illustrates a portable multifunction device configured with navigation route guidance in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;

widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which may be made up of a video player module and a music player module;

notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
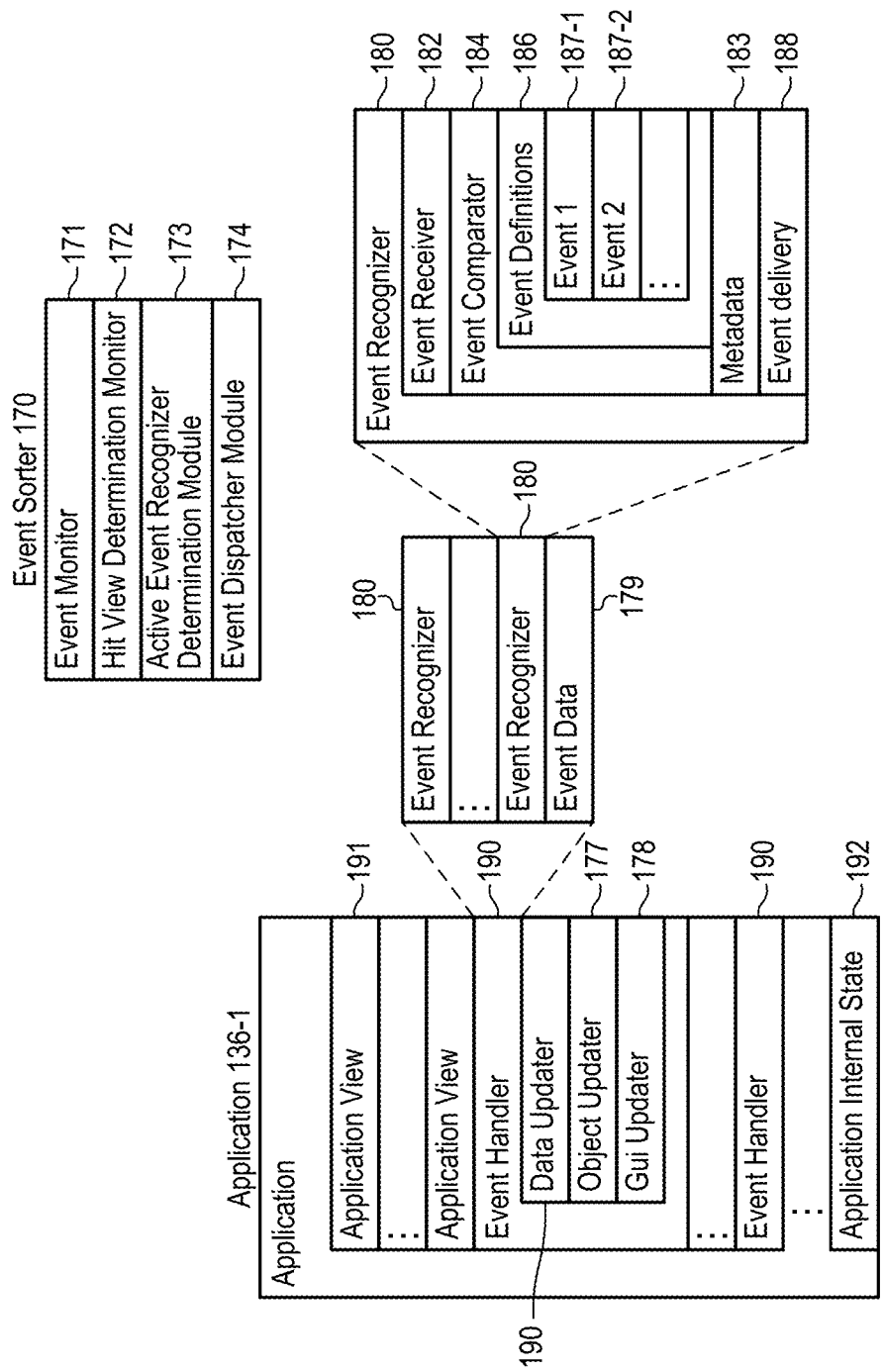
FIG. 1B illustrates a block diagram illustrating example components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes multiple event handlers 190 and one or more application views 191, each of which includes instructions for handling touch events that occur within a respective view of the application's user interface. Each application view 191 of the application 136-1 includes one or more event recognizers 180. Typically, a respective application view 191 includes multiple event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, includes a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
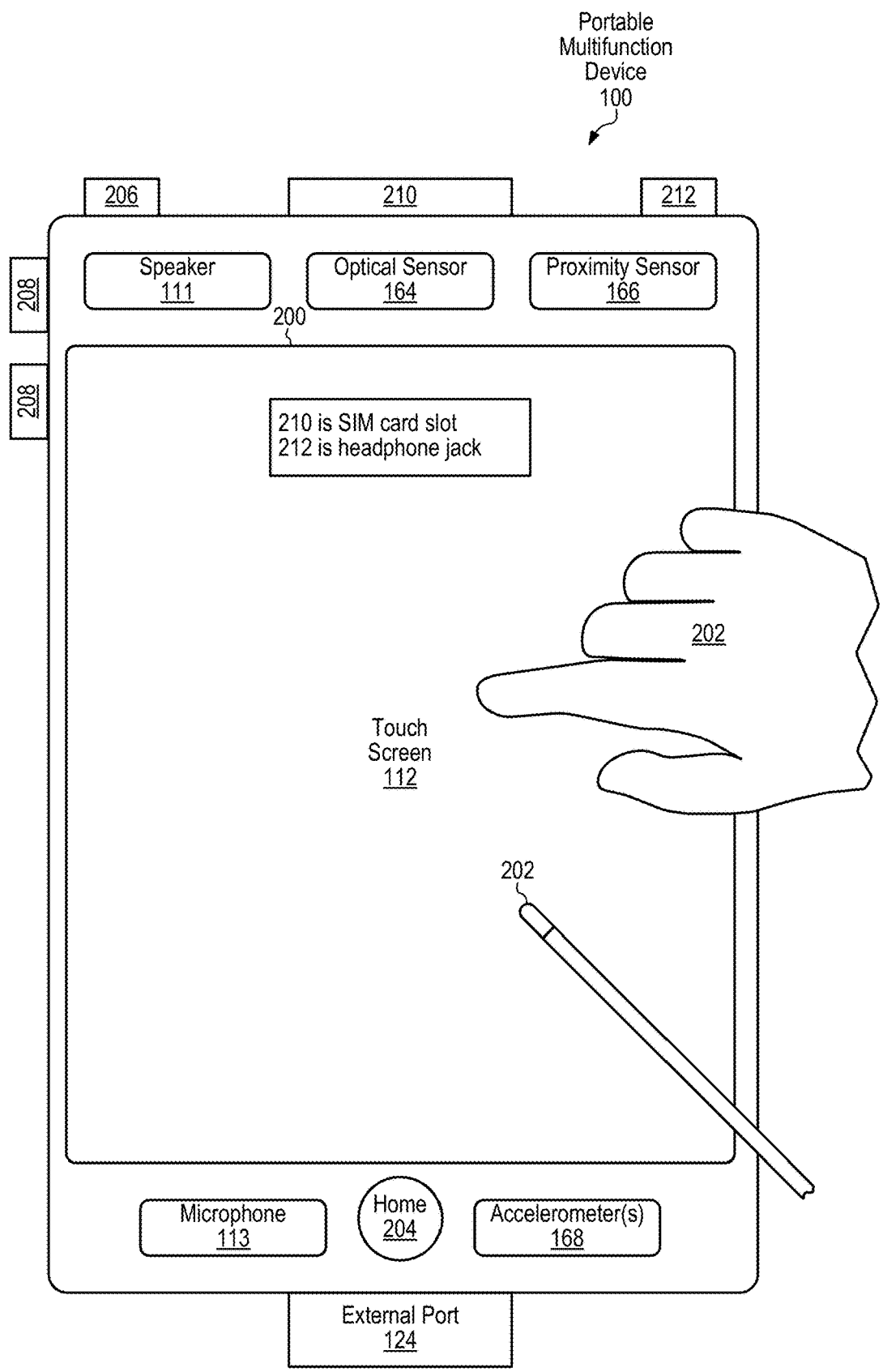
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

Example Mapping Functionality

FIG. 3 illustrates another example of a multifunction device, which may be configured in a manner similar to the multifunction device described above. In the illustrated embodiment, a multifunction device 300 includes a mapping application (e.g., map module 154 described above) that may be stored in one or more memories of multifunction device 300 and executed on one or more processors of multifunction device 300. As is the case for the multifunction device described above, multifunction device 300 may include one or more controls 302 for operating the multifunction device. These controls may include but are not limited to power controls for turning the device on and off, volume controls for adjusting the ear piece volume or the speaker volume, menu controls for navigation functions of the device, and function controls for initiating one or more function or actions on the device. Controls 302 may include hardware controls or software controls. For instance, the bottom left corner of electronic display 312 includes a graphical representation of a control 302 that may be selected by a user, such as by way of touch in accordance with the touch screen functionality described above. Multifunction device 300 may also include other components similar to those described above, such as a microphone 304, an earpiece 306 (e.g., a speaker through which to convey audio representations of telephone calls), an optical sensor 308, and/or a speaker 310. Each of these components may be configured in a similar manner to those like-named components of FIG. 2 described above. Furthermore, electronic display 312 may be configured with touch screen capability, such as touch screen 112 described above. In various embodiments, controls (e.g., on screen control(s) 302) may be utilized to perform any of a variety of map-related functions including but not limited to zoom in, zoom out, rotate screen, pan screen, toggle views (e.g., two-dimensions to three dimensions and vice versa), and/or another map related activity. In various embodiments, one or more gestures may be utilized to perform any of the aforesaid map controls (with or without the use of an actual graphical on-screen control). In one non-limiting example, a one figure gesture may be utilized to adjust the pitch within a three-dimensional map view.

As noted above, multifunction device 300 includes a mapping application that may be stored in one or more memories of multifunction device 300 and executed on one or more processors of multifunction device 300. In the illustrated embodiment, the graphical representation of the mapping application may include a map 314a of a geographic region. This map may be presented as a two-dimensional map or a three-dimensional map, the selection of which may be specified through, e.g., a user-configurable parameter of the mapping application. In some embodiments, the multifunction device may toggle between two-dimensional map or three-dimensional map views responsive to input from any input component of the multifunction device. In one non-limiting example, input from orientation sensor(s) 168 may initiate the transition from a two-dimensional map view to a three-dimensional map, and vice versa. For instance, one or more of orientation sensor(s) 168 may detect a tilt (e.g., a user-initiated tilt) in the orientation of the multifunction device and, in response, initiate the aforesaid toggling.

Map 314a may include a graphical position indicator 316, which may represent the location of the multifunction device within the geographic region of the map. Generally position indicator 316 may represent the current or real-time position of the multifunction device, although it should be understood that in some cases there may exist some small amount of temporal latency between the actual position of the multifunction device and the graphical representation of that location (e.g., position indicator 316). This may occur, e.g., when the multifunction device is in motion. In various embodiments, the multifunction device may be configured to perform map matching including but not limited to aligning a sequence of observed user positions with a road network on a digital map. In various embodiments, the multifunction device may be configured to perform a "snap to" function in which the graphical position indicator 316 is aligned onto a roadway when the user's position falls within in a specified threshold distance of the roadway.

Furthermore, multifunction device 300 may generally be operated by a user. For example, multifunction device 300 may in some cases be a smartphone utilized by an individual to make phone calls, send text messages, browse the internet, etc. As use of multifunction device by an individual generally implies the individual is proximate to the multifunction device (e.g., the user may be holding the device in his or her hand), references herein to the location of the device and the location of the user may be considered to be synonymous. However, it should be understood that in some cases the actual position of the multifunction device and the user of that device may differ by some distance. For instance, the user may place his or her multifunction device on a table of an outdoor café while sitting in a nearby chair. In this case, the position of the device and the position of the user may differ by some small amount. In another example, multifunction device 300 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the multifunction device and the position of the multifunction device user may be considered to coincide.

In various embodiments, the map 314a displayed by the multifunction device may include one or more roads (e.g., roads 318a-b), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but limited to readouts from one or more of a directional compass, an altimeter, and/or a thermometer.

In various embodiments, the mapping application may be configured to generate directions from an origination (e.g., an address or a user's current position) to a destination (e.g., an address, landmark, bookmarked/saved location, or point of interest). For instance, an indication of the origination and/or destination may be input into the multi function device by the user. The multifunction device may generate one or more candidate routes between those two points. The multifunction device may select one of those routes for display on the device. In other cases, multiple candidate routes may be presented to the user and the user may select a preferred route. In the illustrated embodiment, one route is illustrated as route 320. The route may also include turn-by-turn directions which may be presented to the user (in 2D or 3D), such as a graphical indication to perform a turn 322a from road 318a to road 318b. In some embodiments, this graphical indication to perform a turn may be supplemented or substituted with an audible indication to turn, such as a voice command from speaker 310 that indicates the user is to "turn left in 100 yards," for example. In some embodiments, the route that is selected may be presented to the user as a route overview. For instance, before proceeding with navigation, the multifunction device may generate a route overview display that graphically indicates key information for the route, such as key turns, route distance and/or an estimated time for traversing the route. In some cases, the multifunction device may be configured to generate a display of driving maneuvers (e.g., turns, lane changes, etc.) that occur in quick succession, either in the route overview or during actual navigation. This information may help the user safely prepare for such maneuvers. In some cases, the route information may be presented in a list format, such as a list of turns or other maneuvers.

In various embodiments, the mapping application of the multifunction device may be configured to track the position of the user over time and correspondingly adjust the graphical position indicator 316 to indicate the new position. For instance, the mapping application may determine that the user is traveling along route 320 from position information (e.g., information from GPS module 135) and update the map 314a accordingly. For instance, in some cases the map 314 may remain stationary while position indicator 316 is moved along the route. In other cases, position indicator 316 may remain stationary or "fixed" while map 314 is moved (e.g., panned, turned, etc.) around the position indicator.

In various embodiments, the multifunction device may be configured to display alternate or contingency routes. In some cases, these routes may be selectable by the user (e.g., via the touch screen interface). In other cases, the multifunction device may select a best route based on one or more parameters, such as shortest distance or time. In some cases, these parameters or preferences may be set by the user.

As described in more detail below, the multifunction device may in various embodiments receive routing information that specifies a route from a map service. In some case, the multifunction device may carry out navigation guidance in accordance with this route. However, in some cases, the multifunction device may perform a reroute operation in order to generate a new route to the destination. For instance, the user may have deviated from the original route or explicitly requested a new route. In some cases, the multifunction device may perform rerouting based on cached map data stored on the multifunction device.

In various embodiments, the multifunction device may be configured to perform route correction based on real-time data, such as updates in map information, road conditions, traffic conditions, and/or weather conditions. For instance, the multifunction device may be configured to alter a route such that the route avoids a construction zone or a dangerous storm cell.

In various embodiments, the multifunction device may be configured to perform lane guidance independently or as part of navigation guidance. For instance, the multifunction device may, in response to detecting that multiple turns follow in quick succession, provide the user with a direction or suggestion as to which lane to occupy. For instance, a voice or visual indication may specify that the user "turn right, then move to the left lane" in anticipation of a subsequent left turn. In another example, the multifunction device may detect one or more lane closures (e.g., due to construction or other reasons) and instruct the user to avoid such lanes.

In various embodiments, the multifunction device may be configured to generate voice prompts for directions. For instance, during navigation guidance, the multifunction device may be configured to generate audio representations of the next turn or driving maneuver on the route. For instance, the multifunction device may be configured to audibly indicate the user should "turn left in 100 yards" or some other audible indication of a maneuver.

In various embodiments, the multifunction device may be responsive to various voice commands for performing actions including a command to obtain a route. For instance, the multifunction device may interpret the user's voice through a microphone or other transducer of the multifunction device. The user may specify an origination and a destination for the requested route. In various embodiments, the multifunction device may be configured to utilize the user's current location as the origination for the route.

In various embodiments, the multifunction device may be configured to perform a search along a specific route, such as current navigation route. For instance, the user of the multifunction device may request the location of points of interest, such as fuel stations or restaurants. However, if a user is traveling along a particular route, they may not be particularly interested in points of interest that are not proximate to that route. As such, the multifunction device may be configured to scope any searches to points of interested within a specified distance away from the route. In various embodiments, this distance may be a configurable parameter.

In various embodiments, the multifunction device may be configured to display various graphical layers including but not limited to a graphical map information, aerial images (e.g., satellite-acquired images), and/or traffic information. For instance, in the traffic information example, the multifunction device may overlay color coded traffic information on roadways to indicate the speed at which traffic is flowing. For example, green color coding may be used to indicate traffic is flowing normally, and yellow or red may be used to indicate traffic slowdowns.

In various embodiments, the multifunction device may be configured to display any quantity of metrics or statistics about a navigation route including but not limited to an estimated time of arrival (ETA), travel distance remaining, average speed (overall or moving average), top speed, and/or other route statistics.

In various embodiments, the multifunction device may be configured to display routes at different angles in order to accommodate the preferences of different users. Such viewing angles may include a birds eye view for two-dimensional maps to any of a variety of camera angles available for a three-dimensional map.

In various embodiments, the multifunction device may be configured to provide navigation information other than map and routing information. For instance the multifunction device may expose output from any of the hardware device described above with respect to FIG. 1. In one non-limiting example, an orientation sensor 168 may include a compass that outputs direction data. The multifunction device described herein may be configured to display this directional data as a virtual compass, for example.

Map Service Operating Environment

Figure 4:
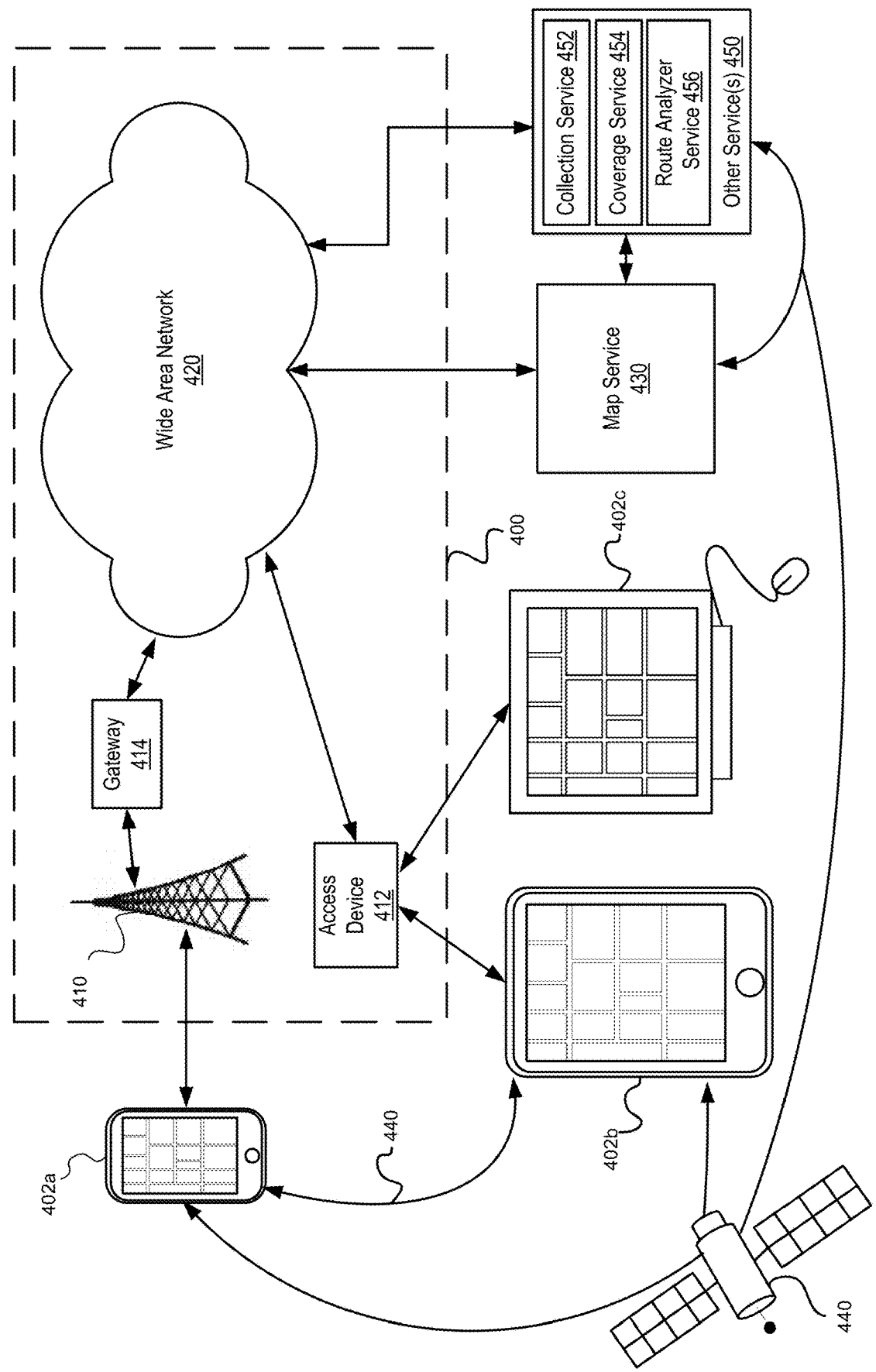
FIG. 4 illustrates a map service operating environment in accordance with some embodiments.

Various embodiments may operate within a map service operating environment. FIG. 4 illustrates a map service operating environment, according to some embodiments. A map service 430 may provide map services for one or more client devices 402a-402c in communication with the map service 430 through various communication methods and protocols. A map service 430 generally may provide map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 402a-402c may utilize these map services by obtaining map service data. Client devices 402a-402c may implement various techniques to process map service data. Client devices 402a-402c may then provide map services to various entities, including, but not limited to, users, internal software or hardware modules, and/or other systems or devices external to the client devices 402a-402c.

In some embodiments, a map service may be implemented by one or more nodes in a distributed computing system. Each node may be assigned one or more services or components of a map service. Some nodes may be assigned the same map service or component of a map service. A load balancing node may distribute access or requests to other nodes within a map service. In some embodiments a map service may be implemented as a single system, such as a single server. Different modules or hardware devices within a server may implement one or more of the various services provided by a map service.

A map service may provide map services by generating map service data in various formats. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map may produce the original map. Tiles may be generated from map image data, routing or navigation data, or any other map service data. In some embodiments map tiles may be raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or a Drawing File (.drw). Embodiments may also include tiles with a combination of vector and raster data. Metadata or other information pertaining to the map tile may also be included within or along with a map tile, providing further map service data to a client device. In various embodiments, a map tile may be encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associated with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 402a-402c) may be implemented on different device types. Examples of a portable-multifunction device include the devices illustrated in FIGS. 1 through 4, such as multifunction device 100 and multifunction device 300. Client devices 402a-402c may utilize map service 430 through various communication methods and protocols described below. In some embodiments, client devices 402a-402c may obtain map service data from map service 430. Client devices 402a-402c may request or receive map service data. Client devices 402a-402c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. Embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 4 illustrates one possible embodiment of an operating environment 400 for a map service 430 and client devices 402a-402c. In some embodiments, devices 402a, 402b, and 402c can communicate over one or more wire or wireless networks 410. For example, wireless network 410, such as a cellular network, can communicate with a wide area network (WAN) 420, such as the Internet, by use of gateway 414. A gateway 414 may provide a packet oriented mobile data service, such as General Packet Radio Service (GPRS), or other mobile data service allowing wireless networks to transmit data to other networks, such as wide area network 420. Likewise, access device 412 (e.g., IEEE 802.11g wireless access device) can provide communication access to WAN 420. Devices 402a and 402b can be any portable electronic or computing device capable of communicating with a map service, such as a portable multifunction device described below with respect to FIGS. 1 to 4. Device 402c can be any non-portable electronic or computing device capable of communicating with a map service, such as a system described below in FIG. 4.

In some embodiments, both voice and data communications can be established over wireless network 410 and access device 412. For example, device 402a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 410, gateway 414, and WAN 420 (e.g., using Transmission Control Protocol/Internet Protocol (TCP/IP) or User Datagram Protocol (UDP)). Likewise, in some implementations, devices 402b and 402c can place and receive phone calls, send and receive e-mail messages, and retrieve electronic documents over access device 412 and WAN 420. In various embodiments, any of the illustrated client device may communicate with map service 430 and/or other service(s) 450 using a persistent connection established in accordance with one or more security protocols, such as the Secure Sockets Layer (SSL) protocol or the Transport Layer Security (TLS) protocol.

Devices 402a and 402b can also establish communications by other means. For example, wireless device 402a can communicate with other wireless devices (e.g., other devices 402a or 402b, cell phones) over the wireless network 410. Likewise devices 402a and 402b can establish peer-to-peer communications 440 (e.g., a personal area network) by use of one or more communication subsystems, such as Bluetooth® communication from Bluetooth Special Interest Group, Inc. of Kirkland, Wash. 402c can also establish peer to peer communications with devices 402a or 402b. (not pictured). Other communication protocols and topologies can also be implemented. Devices 402a and 402b may also receive Global Positioning Satellite (GPS) signals from GPS 440.

Devices 402a, 402b, and 402c can communicate with map service 430 over the one or more wire and/or wireless networks, 410 or 412. For example, map service 430 can provide a map service data to rendering devices 402a, 402b, and 402c. Map service 430 may also communicate with other services 450 to obtain data to implement map services. Map service 430 and other services 450 may also receive GPS signals from GPS 440.

In various embodiments, map service 430 and/or other service(s) 450 may be configured to process search requests from any of the client devices. Search requests may include but are not limited to queries for business, address, residential locations, points of interest, or some combination thereof. Map service 430 and/or other service(s) 450 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 430 and/or other service(s) 450 may be configured to provide auto-complete search results that may be displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the internet) by map service 430 and/or other service(s) 450, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device may be configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 430 and/or other service(s) 450 may provide one or more feedback mechanisms to receive feedback from client devices 402a-c. For instance, client devices may provide feedback on search results to map service 430 and/or other service(s) 450 (e.g., feedback specifying ratings, reviews, temporary or permanent business closures, errors etc.); this feedback may be used to update information about points of interest in order to provide more accurate or more up-to-date search results in the future. In some embodiments, map service 430 and/or other service(s) 450 may provide testing information to the client device (e.g., an AB test) to determine which search results are best. For instance, at random intervals, the client device may receive and present two search results to a user and allow the user to indicate the best result. The client device may report the test results to map service 430 and/or other service(s) 450 to improve future search results based on the chosen testing technique, such as an AB test technique in which a baseline control sample is compared to a variety of single-variable test samples in order to improve results.

In various embodiments, other services 450 may also include a collection service 452 configured to collect and aggregate signal strength information from client devices (e.g., client devices 402a-c). Other services 450 may also include a coverage service 454 configured to generate a signal strength map based on the information collected by collection service 452. Other service 450 may also include a route analyzer service 456 configured to analyze a signal strength map and a candidate route to generate a map tile priority. In regard to other service 452-456, additional description of functionality is described in more detail below.

Aggregate Coverage Information

Figure 5A:
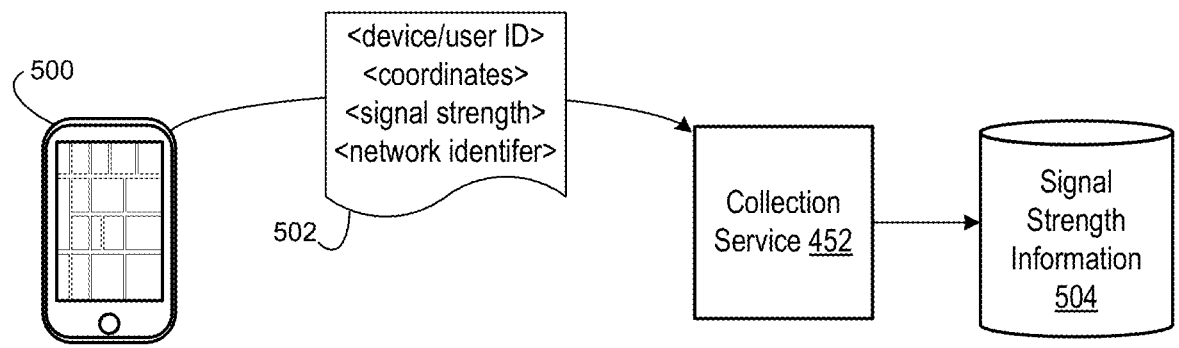
FIG. 5A illustrates a data flow diagram for collecting location and signal strength information from a portable multifunction device in accordance with some embodiments.

As described above, a collection service 452 may be configured to collect and aggregate signal strength information from client devices (e.g., client devices 402a-c). FIG. 5A illustrates a flow diagram of collection service 452 receiving a signal strength message from a client device 500, which may be similar to any of the multifunction devices described above (e.g., client devices 402a-c). In various embodiments, as a given client device 500 is transferred about (e.g., while its user is walking or driving), the client device may periodically or aperiodically report signal strength information to a collection service 452. One example of this signal strength information is signal strength message 502. In the illustrated embodiment, the signal strength message may include a device and/or user identifier, information specifying a location or position of the device (e.g., coordinates in the illustrated example), and a measure of signal strength measured by the client device at that location or position. In various embodiments, the client device may utilize a positioning component (e.g., GPS module 135) to determine the coordinates or other location information to be included within the message. In various embodiments, the signal strength message may also include information about the network that was measured for signal strength. In the illustrated embodiment, this network information is presented as a network identifier (e.g., information identifying a cellular or WiFi network) although in other embodiments additional information about the network may be specified. In some cases, some information illustrated as part of the signal strength message may be omitted; in some cases, addition information may be included. In various embodiments, collection service 452 may store the client-reported signal strength messages, such as within signal strength information data store 504. This signal strength information may be evaluated by the coverage service to generate a signal strength map as described in more detail below.

Figure 5B:
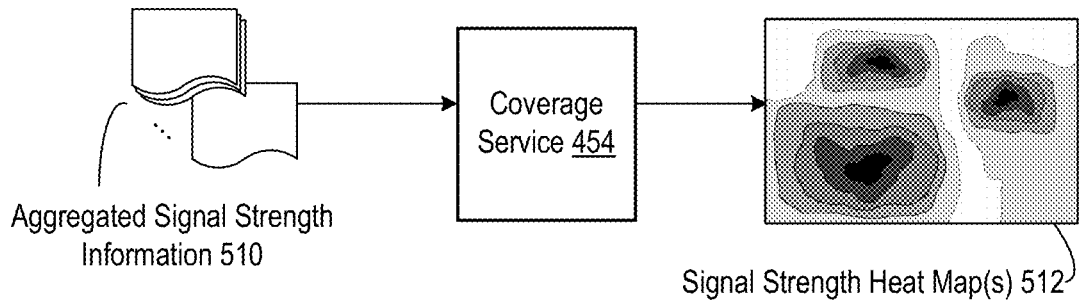
FIG. 5B illustrates a data flow diagram for generating a heat map from aggregated signal strength information in accordance with some embodiments.

FIG. 5B illustrates the creation of a signal strength heat map by the coverage service. In various embodiments, coverage service 454 may receive aggregated signal strength information 510 (e.g., from signal strength information data store 504) for a particular region. For instance, the aggregated signal strength information may include an aggregation of the signal strength messages for the particular region. The coverage service 454 may be configured to generate a signal strength map based on this aggregated signal strength information. For clarity of illustration, the illustrated signal strength map is represented as a heat map in which darker shading indicates higher signal strength relative to areas of lighter shading. While the illustrated embodiments represent the signal strength map in the format of a heat map, other embodiments may generate graphical representations of signal strength map in other graphical configurations.

To generate data points for the signal strength heat map, the coverage service may perform one or more statistical analyses on the signal strength information for various locations including individual positions (e.g., a point position) or an area/region. For instance, for a given location, coverage service 454 may generate the mean or median signal strength value from the n-most signal strength values for that location. In other cases, different analyses and associated signal values (e.g., maximum signal values or quartile signal values) may be conveyed on the signal strength heat map.

Note that in the illustrated embodiments the signal strength heat map need not be generated as a graphical representation. For instance, the signal strength heat map may be generated as a data structure defining the heat map (e.g., a data structure from which a graphical representation may be generated). In another example, the signal strength heat map may be generated as a database (or other model) for automated evaluation of signal strength values at different locations.

Figure 5C:
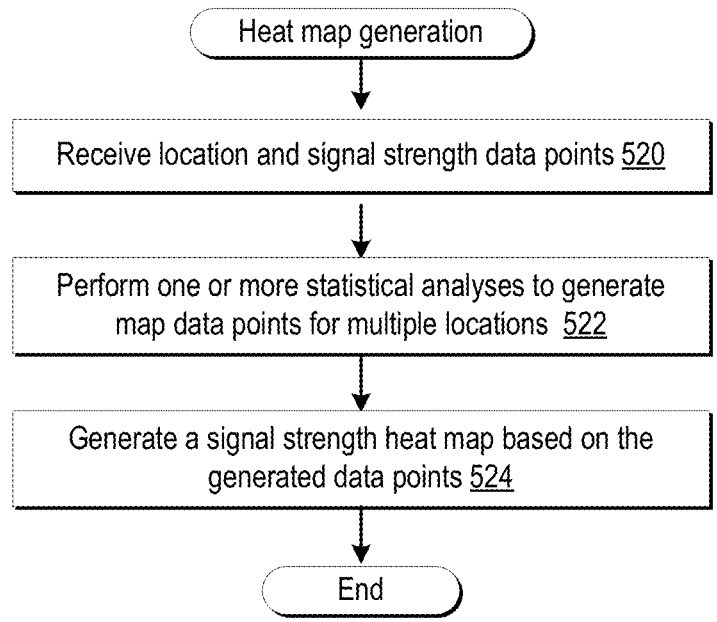
FIG. 5C illustrates a flowchart of an example method for generating a heat map from aggregated signal strength information in accordance with some embodiments.

FIG. 5C illustrates a flowchart of an example method for generating a heat map of signal strength values. As illustrated at block 520, the method may include receiving location and signal strength data points. For instance, in some embodiments, such a data point might include information from the signal strength messages described above including but not limited to information specifying a location or position of a client device, and a measure of signal strength measured by the client device at that location or position. As illustrated at block 522, the method may also include performing one or more statistical analyses on the signal strength information for various locations (e.g., a point position or an area/region) to generate map data points. For instance, for a given location, the method may include generating the mean or median signal strength value from the n-most signal strength values for that location. In other cases, different statistical or numerical analyses may be used on the client-reported signal strength information in order to generate the map data points or values that populate the heat map. As illustrated at block 524, the method may include generating the signal strength heat map based on the values resulting form the one or more statistical analyses. For instance, the method may include generating the heat map by plotting the mean or median signal values as different colors or shades. In one non-limiting example, the method may include generating a signal strength heat map in which darker shading indicates higher signal strength relative to areas of lighter shading (e.g., signal strength heat map 512).

Route Analysis and Map Tile Priority

Figure 6A:
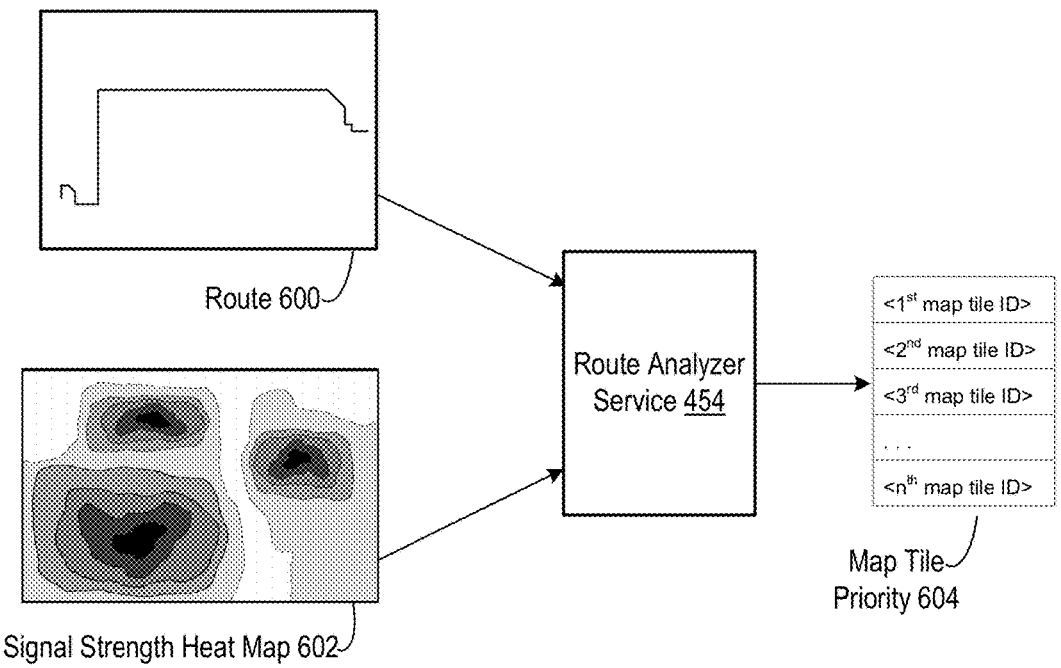
FIG. 6A illustrates a data flow diagram for analyzing a route and signal strength heat map to generated a map tile priority in accordance with some embodiments.
Figure 6B:
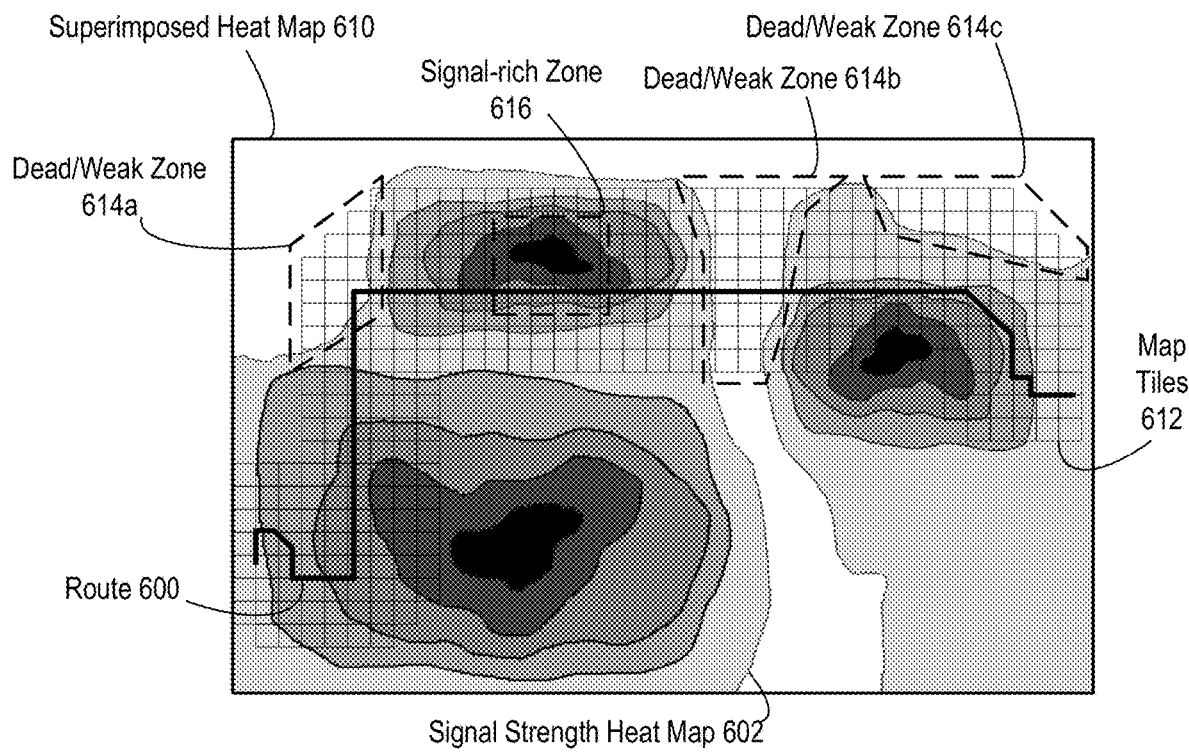
FIG. 6B illustrates the analysis of a signal strength heat map to identify weak or dead zones in signal strength along a route in accordance with some embodiments.
Figure 6C:
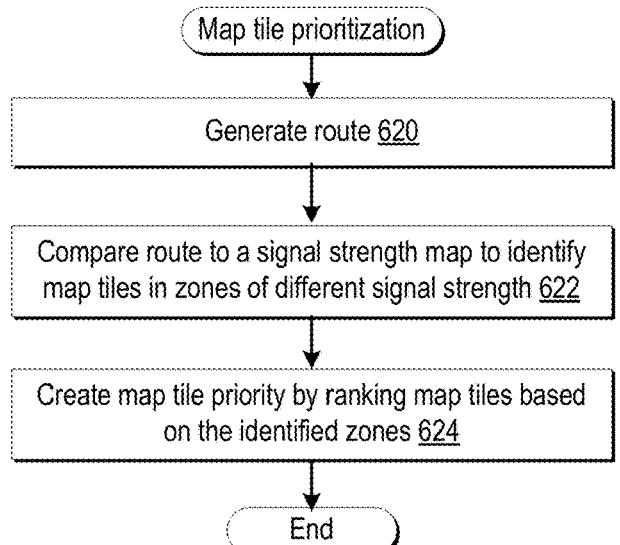
FIG. 6C illustrates a flowchart of an example method for analyzing a route and signal strength heat map to generate a map tile priority in accordance with some embodiments.

FIG. 6A-6C illustrate techniques for using the signal strength maps to identify a given route's weak or dead spots, which may include locations lacking requisite signal strength for a desired level of data transfer, such as may be used for acquisition of map tiles from a mapping service (e.g., map service 430). These weak spots may influence the order of map tile priority 604, which as described in subsequent Figures may define the order in which map tiles are acquired from a map service. In FIG. 6A, route analyzer service 454 may be configured to receive a route 600. In various embodiments, route 600 may include a route for directions or navigation guidance requested by a client device (described in more detail with respect to 7A). Route analyzer service 454 may also receive a signal strength heat map 602 representing an area inclusive of route 600. Signal strength heat map 602 may be generated utilizing the techniques described above with respect to signal strength heat map 512. Route analyzer service 454 may be configured to perform one or more comparative analyses on route 600 and signal strength heat map 602 to generate a map tile priority 604. These comparative analyses are described in more detail below with respect to FIG. 6B.

Generally the map tile priority 604 may specify a priority for map tiles in which map tiles representing zones of no signal strength or weak signal strength (e.g., as defined by a configurable threshold signal strength value) are assigned a higher priority than map tiles representing zones having the requisite signal strength for a desired level of data transfer (e.g., data transfer for the client devices acquisition of map tiles from the map service). As described in more detail with respect to subsequent Figures, client devices may use this map tile priority for requesting map tiles as well as evicting map tiles from the client's local cache. For instance, map tiles of a higher priority (e.g., areas of worse signal strength) may be requested before the traversal of a route as these tiles may be difficult to retrieve when the client device is located in areas of poor signal strength. Map tiles of a lower priority (e.g., areas having the requisite signal strength for map tile acquisition on-the-fly) may be downloaded en route.

FIG. 6B illustrates a graphical representation of the techniques utilized to identify the priority of different map tiles; these techniques may be utilized by route analyzer service 454 to generate a map tile priority, such as map tile priority 604. In the illustrated embodiment a superimposed heat map 610 may be generated by overlaying route 600 on top of signal strength heat map 602. As illustrated, route 600 intersects areas of different signal strength (e.g., different shaded zones, darker shades representing higher signal strength). For clarity of illustration, the illustrated signal strength map is represented as a heat map in which darker shading indicates higher signal strength relative to areas of lighter shading. Map tiles 612 represent the tiles to be downloaded onto the client device in order to display the requisite map information (e.g., raster-based or vector-based map information) for the route. Generally these map tiles may be defined as tiles representing areas within some configurable distance from the route. As illustrated, map tiles 612 may also be overlaid on the signal strength heat map in their respective locations. The route analyzer service 454 may be configured to assign a priority to each map tile based on the strength of the signal strength zone that the map tile overlaps. The route analyzer may include rules for handling map tiles overlapping an intersection of two different signal strength zones, such as assigning the lowest overlapping signal strength to the map tile. In the illustrated embodiments, the map tiles associated with areas having the lowest signal strength may be assigned the highest priority in map tile priority 604. For instance, map tiles residing in areas of little or no signal strength, which are illustrated as dead/weak zones 614a-c in the illustrated embodiment, may be assigned the highest priority. In another example, tiles within a signal-rich zone may be assigned the lowest priority as the map tiles may be downloaded en route (e.g., on-the-fly) over a wireless data connection.

FIG. 6C illustrates a flowchart of an example method for generating a map tile prioritization. As illustrated, block 620 may include generating a route 620, such as by utilizing the techniques described above with respect to map service 430. Generally generating a route may include identifying an efficient travel path between an origination and a destination. As illustrated at block 622, the method may include comparing the route to a signal strength map to identify map tiles in zones of different signal strength. For instance, this portion of the method may include overlaying a representation of the route on the signal strength map, such as described above with respect to superimposed heat map 610. This portion of the method may also include identifying the map tiles relevant to the route, such as map tiles within a requisite distance from the route. The method may include assigning a priority to each map tile based on the strength of the signal strength zone that the map tile overlaps. The method may also include enforcing rules for handling map tiles overlapping an intersection of two different signal strength zones of the signal strength map, such as rule that specifies the lowest overlapping signal strength is to be assigned to the map tile. As illustrated by block 624, the method may also include creating the map tile priority by ranking map tiles. For instance, map tiles residing in areas of little or no signal strength may be assigned the highest ranking within the priority. Tiles within a signal-rich zone may be assigned the lowest priority as the map tiles may be downloaded en route (e.g., on-the-fly) over a wireless data connection. One example of a map tile priority that may be generated with the illustrated method includes map tile priority 604, which is described above.

Figure 7A:
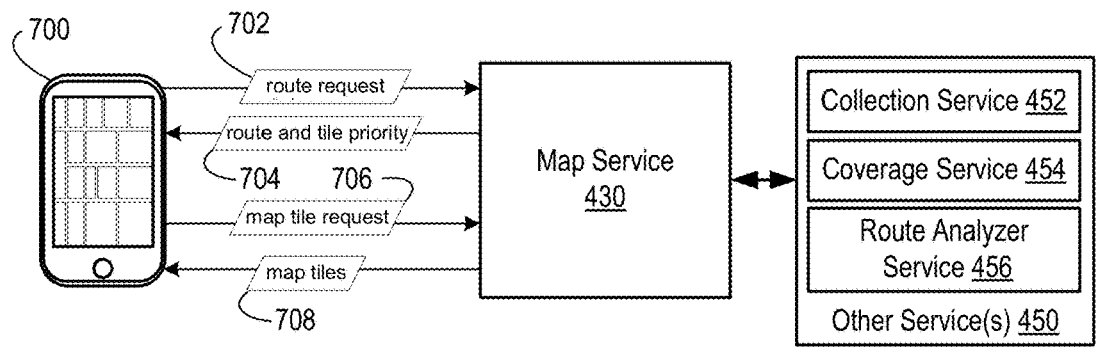
FIG. 7A illustrates a flow diagram of a client device acquiring map tiles in accordance with a map the priority, according to some embodiments.
Figure 7B:
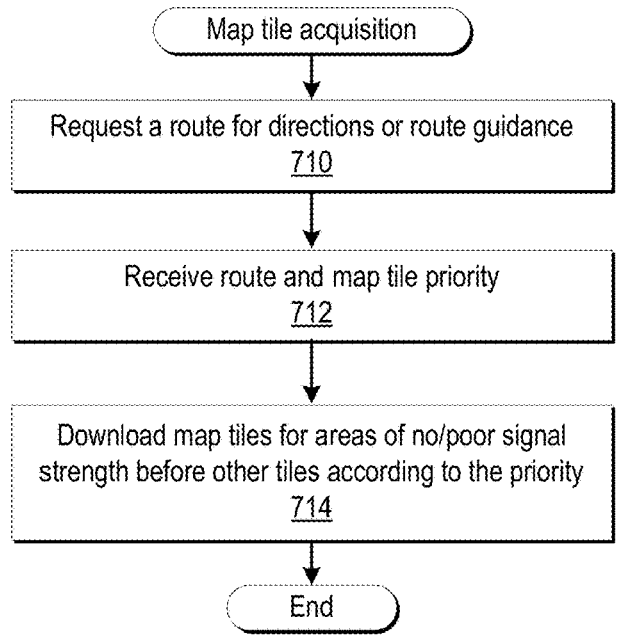
FIG. 7B illustrates a flowchart for acquiring map tiles in accordance with a map tile priority, according to some embodiments.

While FIGS. 6A-6C provide examples for generating a map tile priority, FIGS. 7A-7B illustrate techniques for utilizing the map tile priority for a client device's efficient acquisition of map tiles for a given route. For instance, FIG. 7A illustrates a dataflow diagram for a client device's acquisition of map tiles based on the map tile priority described herein. In the illustrated embodiments, client device 700 (e.g., similar to the client devices and multifunction devices described above) may issue a route request 702 to map service 430 in accordance with any of the techniques described above. In response, map service 430 may determine the route and associated map tile priority according to the techniques described above, and also provide the route and tile priority 704 to the client device. Instead of requesting map tile sequentially, client device 700 may instead request map tiles via map tile request 706 on the basis of priority as specified by the received map tile priority. For instance, the map tile priority may specify a priority order for map tiles in which map tiles representing zones of no signal strength or weak signal strength (e.g., as defined by a configurable threshold signal strength value) are assigned a higher priority than map tiles representing zones having the requisite signal strength for a desired level of data transfer (e.g., data transfer for the client devices acquisition of map tiles from the map service). The client device may download map tiles 708 provided by the map service 430 in response to map tile request 706.

In some embodiments, the mapping component of client device 700 may utilize the map tile priority to identify the highest priority map tiles (e.g., map tiles for areas of the worst signal strength) and request these tiles before (or during the initial phase of) route guidance. In this way, these high priority map tiles may be cached before the client device ever reaches the areas of poor signal strength. In various embodiments, lower priority tiles (e.g., map tiles associated with areas having sufficient signal strength for data transfer) may be downloaded en route (e.g., "on-the fly").

FIG. 7B illustrates an example method for map tile acquisition. In various embodiments, the illustrated method may be performed by any of the client devices described herein. As illustrated by block 710, the method may include requesting a route for direction or route guidance (e.g., navigation). In various embodiments, the route request may specify an origination and a destination between which a user desires to travel. In various embodiments, requesting a route may include sending a request to a map service, such as described above with respect to route request 702. Subsequent to the request, the method may include receiving an indication of the route and an associated map tile priority, as illustrated at block 712. In various embodiments, the method may include receiving a map tile priority structured in a manner similar to that of map tile priority 604 described above. For instance, the map tile priority may specify a priority for map tiles in which map tiles representing zones of no signal strength or weak signal strength are assigned a higher priority than map tiles representing zones having the requisite signal strength for a desired level of data transfer.

As illustrated at block 714, the method may include downloading map tiles for areas of no signal strength or poor signal strength before other tiles in accordance with the map tile priority. For instance, the method may include using the map tile priority to identify the highest priority map tiles (e.g., map tiles for areas of the worst signal strength) and request these tiles before (or during the initial phase of) route guidance. In this way, these high priority map tiles may be cached before reaching the areas of poor signal strength. In various embodiments, lower priority tiles (e.g., map tiles associated with areas having sufficient signal strength for data transfer) may be downloaded en route.

Figure 7C:
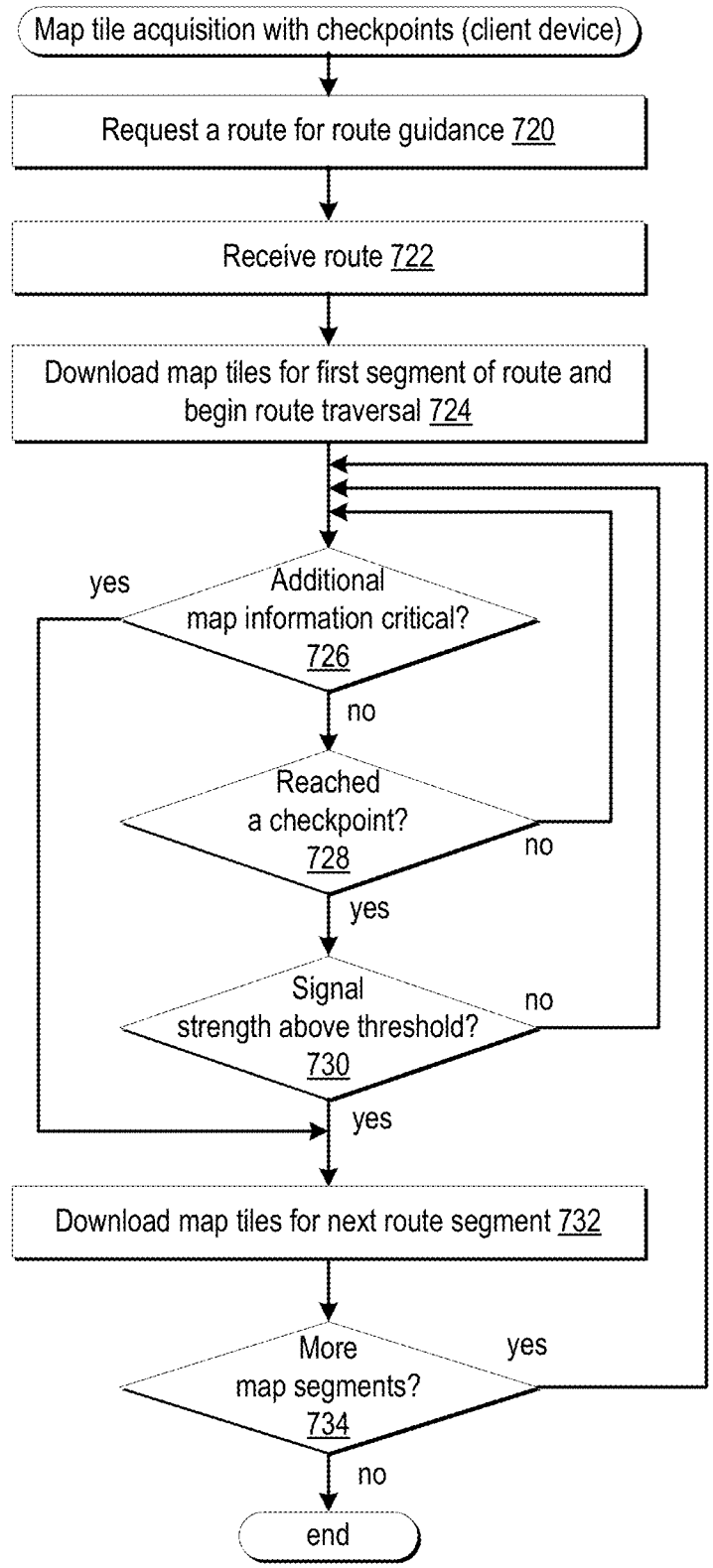
FIG. 7C illustrates a flowchart for acquiring map tiles in accordance with a check-pointing technique, according to some embodiments.

FIG. 7C illustrates another example method for map tile acquisition using check-points. In various embodiments the illustrated method may be utilized as a substitute to the method of FIG. 7B. In other cases, aspects of each method may be combined to perform a hybrid approach to map tile acquisition (e.g., the method of FIG. 7B may be augmented with the check-pointing technique of FIG. 7C). In various embodiments, the illustrated method may be performed by any of the client devices described herein. As illustrated at block 720, the method may include requesting a route for route guidance. In various embodiments, the route request may specify an origination and a destination between which a user desires to travel. In various embodiments, requesting a route may include sending a request to a map service, such as described above with respect to route request 702. Subsequent to the request, the method may include receiving an indication of the route, as illustrated at block 724. For instance, the route may specify driving directions from the origination to the destination. As illustrated at block 724, the method may also include downloading map tiles for the first segment of the route. For instance, the route may be logically partitioned into different route segments (e.g., 10 kilometer segments) and the first of these segments may be downloaded and cached (e.g., onto a client device).

At block 726 the method may include determining whether the download of additional map information is critical at the current position within the route traversal. For instance, the method may include monitoring the distance to the next portion of the route for which tiles have not been obtained. If this distance falls below a specified threshold, the method may determine that it is critical to download (or at least attempt to download) tiles for that portion of the route regardless of the current signal reception of the client device. As illustrated by the positive output of block 726, when additional map information is determined to be critical, the method may proceed to block 732 in which map tiles for the next route segment are downloaded. As illustrated by the negative output of block 726, if it is determined that additional map information is not critical, the method may evaluate whether a checkpoint has been reached (block 728). For instance, the client device may place multiple checkpoints (e.g., specified by time or distance) along the route. For instance, in a non-limiting example, a checkpoint may be placed every 3 kilometers of travel. In other cases checkpoints may be specified temporally (e.g., every two minutes a checkpoint is active). As illustrated by the negative output of block 728, if a checkpoint has not been reached, the method returns to block 726.

If a checkpoint has been reached (positive output of block 728), the method may include evaluating whether the current signal strength measured by the client device is above a threshold (e.g., a signal threshold known to provide efficient data transfer speeds), the method may opportunistically download map tiles for the next route segment at block 732. Using checkpoints to optimistically download map tiles according to the techniques described herein may conserve power (e.g., battery power) on the client device implementing the method. For instance, by optimistically downloading map tiles during periods of strong signal reception, the map tiles may be downloaded faster due to higher transfer speeds associated with the strong signal reception. This means the communication radio of the client device may be active for shorter periods of time, thereby causing a power to be conserved on the device. As illustrated at block 734, if there are more map segments left in the route, the method may return to block 726. If there no more map segments to be retrieved, the method may end, as illustrated by the negative output of block 734.

Cache Management

Figure 8:
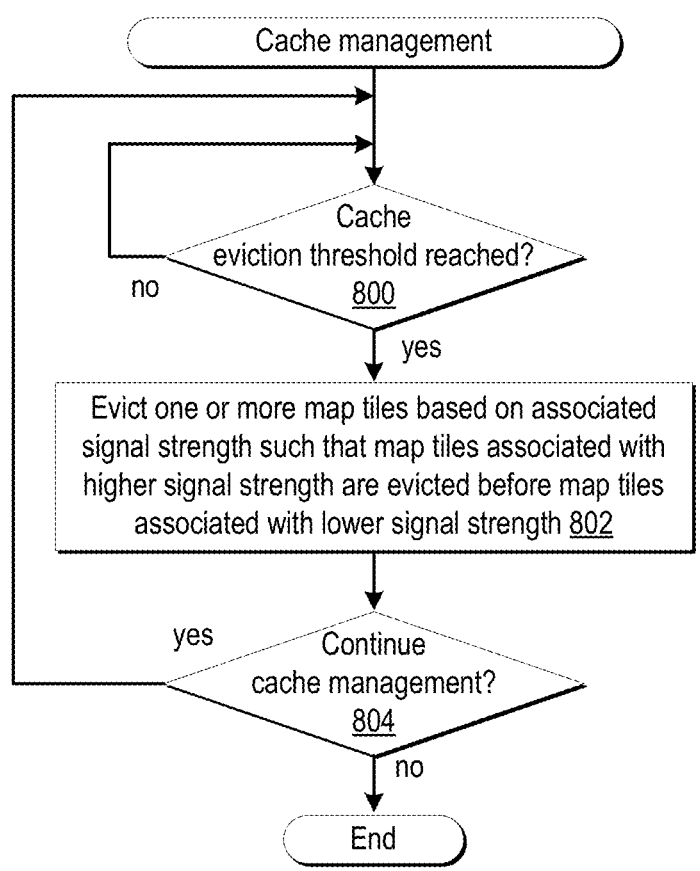
FIG. 8 illustrates a flowchart of an example method managing a cache based on a map tile priority, in accordance with some embodiments.

In various embodiments, the map tile priority described above may also be utilized to efficiently manage the client device's cache of map tiles. One example method for managing the cache of a client device is illustrated at block 800 of FIG. 8. In various embodiments, the illustrated method may be performed by any of the client devices described herein. As illustrated at block 800, the method may include determine whether a cache eviction threshold has been reached. For instance, the cache eviction threshold may specify a threshold that indicates the cache is nearly full and more storage room needs to be opened up for additional entries to be written to the cache. In one non-limiting example, the cache eviction threshold may specify that the cache is nearly full when 90% of the cache storage space is occupied. As illustrated by the negative output of block 800, the method may include continuing to monitor the cache until the threshold is reached. As illustrated by the positive output of block 800, the method may include evicting (e.g., removing or deleting) one or map tiles based on associated signal strength such that map tiles associated with higher signal strength are evicted before map tiles associated with lower signal strength (block 802). In this way, the cache eviction technique may efficiently utilize the cache by preserving map tiles that are harder to acquire (e.g., tiles associated with areas of poor signal coverage) and evicting (if necessary) map tiles that are easier to acquire (e.g., map tiles associated with areas of adequate signal coverage). In various embodiments, for a given route, the method may include utilizing the map tile priority provided by the map service (e.g., map tile priority 604) in order to determine which map tiles are associated with higher signal strength and which map tiles are associated with lower signal strength. For instance, as described above the map tile priority may specify a priority for map tiles in which map tiles representing zones of no signal strength or weak signal strength (e.g., as defined by a configurable threshold signal strength value) are assigned a higher priority than map tiles representing zones having the requisite signal strength for a desired level of data transfer (e.g., data transfer for the client devices acquisition of map tiles from the map service).

Example Computer System

Various embodiments of the system and method for acquiring map portions based on expected signal strength of route segments, as described herein, may be executed on one or more computer systems, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a mapping application 924 incorporating any of the functionality described above. Additionally, data 932 of memory 920 may include mapping information 934 including any of the information or data structures described above, including but not limited to mapping information for rendering map instances (e.g., map tiles), position information indicating past or current positions of the user, and/or route information for navigating from an origination to a destination. In some cases, mapping information 934 may represent a map tile cache. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 9:
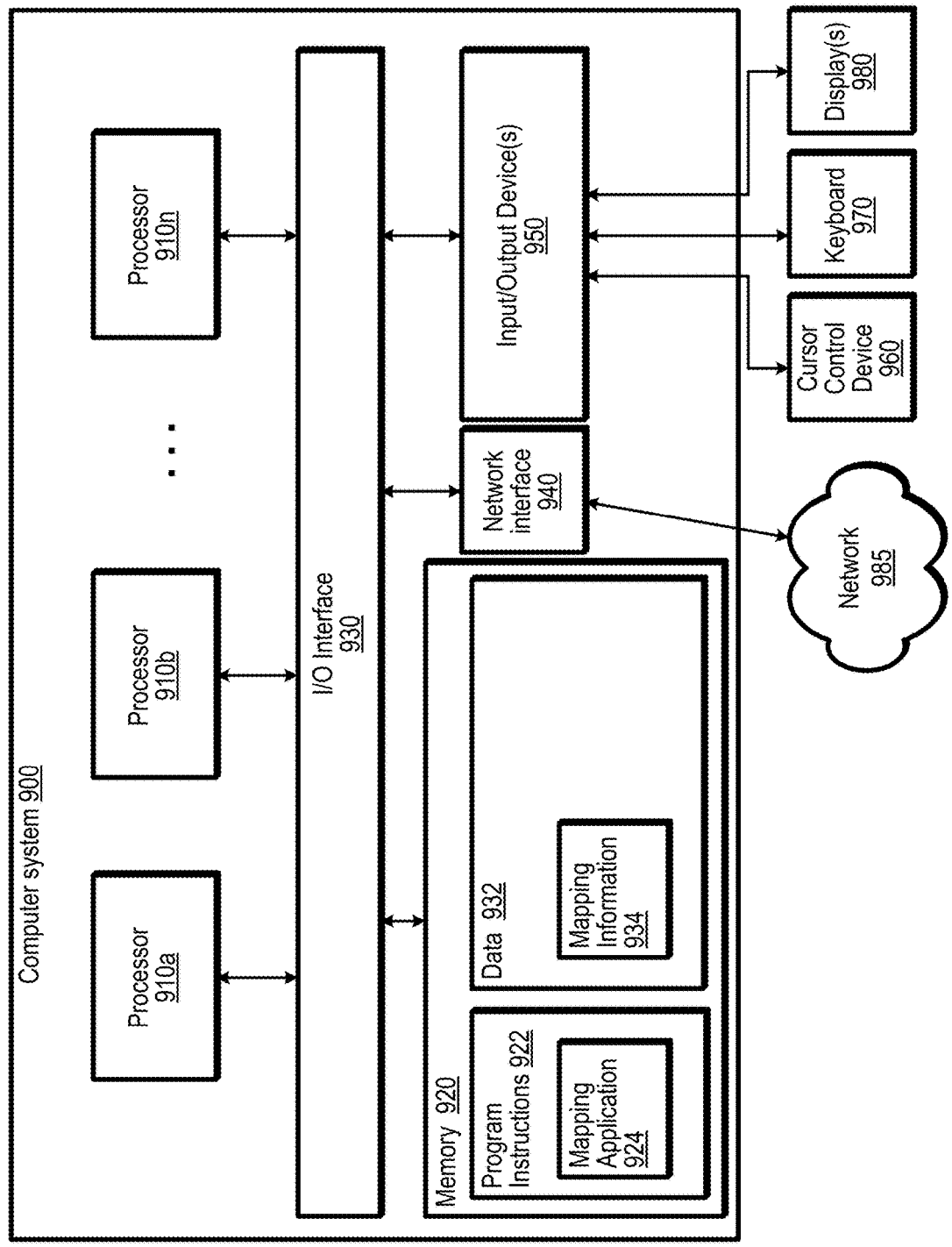
FIG. 9 illustrates an example computer system configured to implement aspects of the system and method for acquiring map portions based on expected signal strength of route segments.

As shown in FIG. 9, memory 920 may include program instructions 922, which may be processor-executable to implement any element or action described above. In one embodiment, the program instructions may implement the methods described above. In other embodiments, different elements and data may be included. Note that data 932 may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium.

Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A device, comprising:
   one or more memories; and
   one or more processors coupled to the one or more memories, wherein the one or more memories comprise program instructions executable by the one or more processors to implement a mapping component configured to:
      request a route;
      receive a set of map portions, wherein each map portion has an associated value assigned to the map portion representing an expected level of signal strength for the respective map portion, wherein the set of map portions comprises at least some sequential map portions along a proximate portion of the route and at least some additional map portions with assigned values indicating expected levels of signal strength below a threshold level of signal strength, wherein the at least some additional map portions are received before other map portions that precede the at least some additional map portions in a sequential order of map portions along the route;
      display at least a portion of a map utilizing one or more of the at least some sequential map portions;
      store the at least some additional map portions within a cache of the one or more memories of the device; and
      update the displayed at least a portion of the map utilizing one or more of the stored at least some additional map portions.

2. The device of claim 1, wherein the program instructions comprise program instructions that cause the mapping component to:
   evict one or more map portions from the cache based, at least in part, on the associated values assigned to each of the one or more map portions representing the expected levels of signal strengths for the one or more map portions.

3. The device of claim 2, wherein map portions associated with high signal strength are evicted before map portions associated with lower signal strength.

4. The device of claim 1, wherein the program instructions comprise program instructions that cause the mapping component to:
   receive an order of priority in which to receive map portions, wherein the order of priority is based at least in part on distinct levels of expected signal strength for each of the map portions; and
   request at least some of the set of map portions according to the order of priority.

5. The device of claim 4, wherein the program instructions comprise program instructions that cause the mapping component to:
   receive the at least some requested map portions; and
   in response to determining that the cache exceeds a storage threshold, evict one or more map portions from the cache based, at least in part, on the associated values assigned to the map portions representing the expected levels of signal strengths for the one or more map portions.

6. The device of claim 1, wherein the device is configured to determine a current signal strength for one or more received communication signals.

7. The device of claim 6, wherein the device is further configured to:
   send one or more messages specifying a location measured by the device and a signal strength for a communication signal measured by the device to a service from which the device receives the set of map portions.

8. The device of claim 6, wherein the device is further configured to:
   at one or more checkpoints, determine whether the current signal strength exceeds a threshold signal strength; and
   responsive to determining that the current signal strength exceeds the threshold signal strength, acquire one or more portions of the map corresponding to additional segments of a route.

9. A system, comprising:
   one or more memories; and
   one or more processors coupled to the one or more memories, wherein the one or more memories comprise program instructions executable by the one or more processors to implement one or more services configured to:
      store signal strength information for multiple portions of a map;
      receive a request from a device requesting a route;
      identify a subset of relevant portions of the multiple portions of the map that are related to the route;
      assign respective values to the relevant portions of the map based, at least in part, on the stored signal strength values associated with the portions of the map; and
      provide a subset of the relevant map portions to the device, wherein the subset of relevant map portions comprises at least some sequential map portions along a proximate portion of the route and at least some additional map portions with assigned values indicating expected levels of signal strength below a threshold level of signal strength, wherein the at least some additional map portions are provided before other relevant map portions that precede the at least some additional map portions in a sequential order of map portions along the route.

10. The system of claim 9, wherein program instructions comprise program instructions that cause the one or more services to:
generate a priority order for the subset of relevant portions of the map, wherein the priority order is generated based on distinct levels of expected signal strength for each of the relevant portions; and
provide the priority order to the device.

11. The system of claim 9, wherein the program instructions comprise program instructions that cause the one or more services to:
receive multiple messages from multiple devices that are remote from the system, wherein each message specifies a location measured by a respective device and a signal strength for a communication signal measured by that device;
perform one or more statistical analyses on the multiple messages to generate expected signal strength values at multiple locations; and
store results of the one or more statistical analyses as the signal strength information for the multiple portions of the map.

12. The system of claim 11, wherein the program instructions comprise program instructions that cause the one or more services to:
store the signal strength information for the multiple portions of the map as a signal strength map;
wherein to perform said identify the subset of relevant portions of the multiple portions of the map and said assign respective values to the relevant portions of the map, the one or more services are configured to:
determine a route based on the route request; and
overlay the determined route on the signal strength map.

13. A non-transitory computer-readable storage medium, storing program instructions computer-executable on a computer to:
request a route;
receive a set of map portions, wherein each map portion has an associated value assigned to the map portion representing an expected level of signal strength for the respective map portion, wherein the set of map portions comprises at least some sequential map portions along a proximate portion of the route and at least some additional map portions with assigned values indicating expected levels of signal strength below a threshold level of signal strength, wherein the at least some additional map portions are received before other map portions that precede the at least some additional map portions in a sequential order of map portions along the route;
cause at least a portion of a map to be displayed utilizing one or more of the at least some sequential map portions;
cause the at least some map portions to be stored within a cache; and
cause the displayed at least a portion of the map to be updated utilizing one or more of the stored at least some additional map portions.

14. The non-transitory medium of claim 13, wherein the program instructions are further computer executable to:
cause one or more map portions to be evicted from the cache based on the associated values assigned to each of the one or more map portions representing the expected levels of signal strengths for the one or more map portions.

15. The non-transitory medium of claim 14, wherein map portions associated with high signal strength are evicted before map portions associated with lower signal strength.

16. The non-transitory medium of claim 13, wherein the program instructions are further computer executable to:
receive an order of priority in which to receive map portions, wherein the order of priority is based, at least in part, on distinct levels of expected signal strength for each of the map portions; and
request at least some of the set of map portions according to the order of priority.

17. The non-transitory medium of claim 16, wherein the program instructions are further computer executable to:
receive the at least some requested map portions; and
in response to determining that the cache exceeds a storage threshold, cause one or more map portions to be evicted from the cache based, at least in part, on the associated values assigned to the map portions representing the expected levels of signal strengths for the map portions.

18. The non-transitory medium of claim 13, wherein the program instructions are further computer executable to:
determine a current signal strength for one or more received communication signals.

19. The non-transitory medium of claim 18, wherein the program instructions are further computer executable to:
cause one or more messages specifying a measured location and a signal strength for a communication signal to be sent to a service from which the set of map portions are received.

20. The non-transitory medium of claim 18, wherein the program instructions are further computer executable to:
determine whether the current signal strength exceeds a threshold signal strength; and
responsive to determining that the current signal strength exceeds the threshold signal strength, request one or more additional portions of the map corresponding to additional segments of a route.

* * * * *